US009080392B1

United States Patent
Allen et al.

(10) Patent No.: US 9,080,392 B1
(45) Date of Patent: Jul. 14, 2015

(54) VORTEX-INDUCED VIBRATION SUPPRESSION DEVICES FOR RETROFITTING

(75) Inventors: Donald Wayne Allen, Richmond, TX (US); William Andrew West, Friendswood, TX (US); Julie Ann Dehne, Cypress, TX (US); Dean Leroy Henning, Richmond, TX (US)

(73) Assignee: VIV Solutions LLC, Richmond, TX (US)

( * ) Notice: Subject to any disclaimer, the term of this patent is extended or adjusted under 35 U.S.C. 154(b) by 0 days.

(21) Appl. No.: 13/594,450

(22) Filed: Aug. 24, 2012

Related U.S. Application Data

(60) Provisional application No. 61/527,416, filed on Aug. 25, 2011.

(51) Int. Cl.
  *E02D 5/60* (2006.01)
  *E21B 17/01* (2006.01)
  *B63B 21/50* (2006.01)

(52) U.S. Cl.
  CPC .......... *E21B 17/01* (2013.01); *B63B 2021/504* (2013.01)

(58) Field of Classification Search
  CPC .... B63B 21/663; B63B 2021/504; F15D 1/10
  USPC ................ 405/216, 211, 211.1, 212; 114/243
  See application file for complete search history.

(56) References Cited

U.S. PATENT DOCUMENTS

| | | | | | |
|---|---|---|---|---|---|
| 5,507,243 | A | * | 4/1996 | Williams et al. | 114/245 |
| 6,048,136 | A | * | 4/2000 | Denison et al. | 405/211 |
| 6,113,313 | A | * | 9/2000 | Blair et al. | 405/216 |
| 6,896,447 | B1 | * | 5/2005 | Taquino | 405/216 |
| 2002/0146287 | A1 | * | 10/2002 | Allen et al. | 405/211 |
| 2010/0146734 | A1 | * | 6/2010 | Munson et al. | 16/334 |
| 2010/0156088 | A1 | * | 6/2010 | Masters et al. | 285/18 |

* cited by examiner

*Primary Examiner* — Doug Hutton, Jr.
*Assistant Examiner* — Patrick Lambe
(74) *Attorney, Agent, or Firm* — Blakely Sokoloff Taylor & Zafman LLP

(57) ABSTRACT

A vortex-induced vibration (VIV) suppression device including a body portion dimensioned to surround a structure subject to VIV, the body portion having a first side and a second side separated by a first opening formed along a length dimension one side of the body portion and a second opening formed along the length dimension of another side of the body portion. The device further including a biasing hinge mechanism attached to the first side and the second side at the first opening, the biasing hinge mechanism to bias the first side and the second side toward one another. The device further including a closure mechanism attached to the first side and the second side at the second opening, the closure mechanism to secure the first side and the second side in a closed position around the structure. The device may be installed according to a retrofit installation method.

19 Claims, 17 Drawing Sheets

VORTEX-INDUCED VIBRATION SUPPRESSION DEVICES FOR RETROFITTING

CROSS-REFERENCE TO RELATED APPLICATIONS

The application claims the benefit of the earlier filing date of U.S. Provisional Patent Application No. 61/527,416, filed Aug. 25, 2011, and incorporated herein by reference.

FIELD

Method and apparatus for retrofitting a vortex-induced vibration (VIV) suppression device onto an underwater tubular using a diver or a remotely operated vehicle (ROV).

BACKGROUND OF THE INVENTION

A difficult obstacle associated with the exploration and production of oil and gas is management of significant ocean currents. These currents can produce vortex-induced vibration (VIV) and/or large deflections of tubulars associated with drilling and production. VIV can cause substantial fatigue damage to the tubular or cause suspension of drilling due to increased deflections.

Two solutions for VIV suppression are helical strakes and fairings. Typically, helical strakes are made by installing fins helically around a cylindrical shell. The cylindrical shell may be separated into two halves and positioned around the tubular to helically arrange the fins around the underlying tubular. While helical strakes, if properly designed, can reduce the VIV fatigue damage rate of a tubular in an ocean current, they typically produce an increase in the drag on the tubular and hence an increase in deflection. Thus, helical strakes can be effective for solving the vibration problem at the expense of worsening the drag and deflection problem.

Another solution is to use fairings as the VIV suppression device. Typical fairings have a substantially triangular shape and work by streamlining the current flow past the tubular. A properly designed fairing can reduce both the VIV and the drag. Fairings can be made to be free to weathervane around the tubular in response to changes in the ocean current.

Fairings and helical stakes have been used to suppress VIV for many applications in the past. They have also been retrofit to tubulars; that is they have been installed underwater after the tubular is in place.

A difficulty with most retrofit suppression designs, however, is that they require tooling to interface with a remote operated vehicle (ROV) for installation. This tooling can be substantial. The tooling can be expensive, difficult and unsafe to use, and requires a slow process for installation of the suppression devices. In addition, it can take months, or even years, to design and fabricate tooling for ROV installation of VIV suppression devices.

BRIEF DESCRIPTION OF THE DRAWINGS

The embodiments disclosed herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION OF THE INVENTION

In this section we shall explain several preferred embodiments with reference to the appended drawings. Whenever the shapes, relative positions and other aspects of the parts described in the embodiments are not clearly defined, the scope of the embodiments is not limited only to the parts shown, which are meant merely for the purpose of illustration. Also, while numerous details are set forth, it is understood that some embodiments may be practiced without these details. In other instances, well-known structures and techniques have not been shown in detail so as not to obscure the understanding of this description.

Figure 1A:
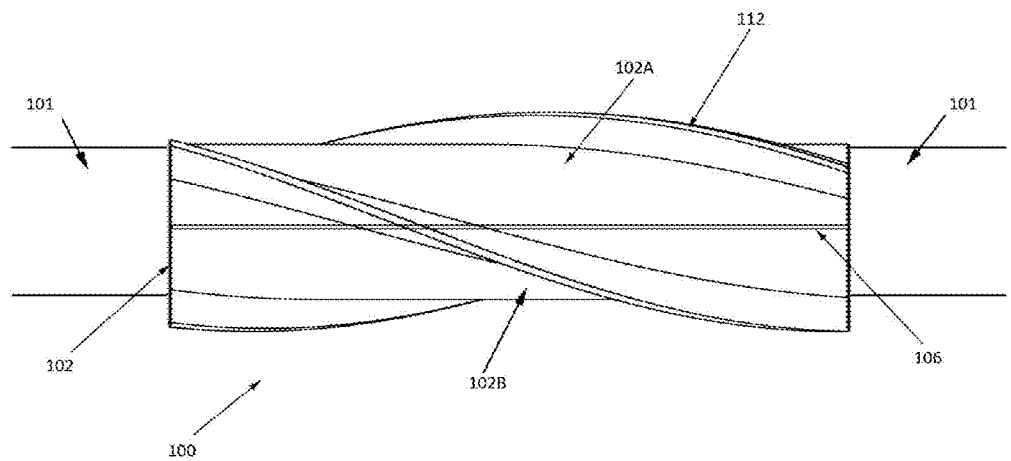
FIG. 1A is a side perspective view of one embodiment of a helical strake on a tubular.

Referring now to the invention in more detail, FIG. 1A shows one embodiment of a VIV suppression device positioned around a support structure. In this embodiment, the VIV suppression device may be a helical strake 100 positioned around a tubular 101. Tubular 101 may be of any type of tubular including, but not limited to, a pipeline, riser, spar, tendon, buoy, rope, or cable. Although a single helical strake 100 is shown, it is to be understood that any number of helical strakes may be positioned along the length of tubular 101.

Helical strake 100 may include strake fins 112 extending from a body portion, in this case a strake sleeve 102, which surrounds the underlying tubular 101 once installed. Fins 112 disrupt the normal flow around tubular 101 and in turn suppress VIV about tubular 101. Any number of fins 112 may be attached to strake sleeve 102, in this embodiment, three fins 112 are provided.

Strake sleeve 102 may have a clam shell configuration in that it is formed by a first side 102A and a second side 102B that can be separated along opening 106 so that helical strake 100 can be placed around tubular 101. In this embodiment, opening 106 is formed along a longitudinal dimension of sleeve 102. When sides 102A and 102B of strake sleeve 102 are positioned around tubular 101, strake sleeve 102 may have a substantially cylindrical shape. In some embodiments, strake sleeve 102 may have an inner diameter substantially the same as or slightly larger than tubular 101 or other underlying structure such that it fits around the tubular 101 or other structure. In the illustrated embodiment, strake fins 112 have a substantially triangular cross-sectional shape, however, other shapes may be suitable (e.g., circular, square, etc.). It is noted, however, that helical strake 100 may be of any geometry with any number, size, and shape of fins.

Helical strake 100 may be of any suitable length, but will typically be from about 4 feet to about 10 feet long. Strake fins 112 may be of any suitable height but will typically range from about 5 to about 50 percent of the tubular diameter, with 20 to 30 percent being the most common height range. The pitch of strake fins 112 may be of any suitable pitch, for example, within a range of from about 5 to about 25 times the tubular diameter, with 10-20 times the tubular diameter being most common. The number of fins may vary from about 1 to about 8, preferably from 3 to 4.

Strake sleeve 102 and fins 112 may be made of any suitable material including, but not limited to, plastic, fiberglass, wood, metal, or synthetics such as rubber or fiber. Strake sleeve 102 and fins 112 may be made of the same or different materials. In some embodiments, strake sleeve 102 having fins 112 extending therefrom may be integrally formed as one piece. For example, strake sleeve 102 may be formed with fins 112 by an extrusion process that sets the helix of fins 112 as the material is drawn through the die. The helix may be set by the die by, for example, rotating the starting material as it is drawn through the die so that a desired helical angle is achieved. Other suitable processes for integrally forming strake sleeve 102 with fins 112 may include an injection molding process, vacuum forming process or other similar process. Opening 106 may be molded into helical strake 100 or formed by a cutting operation after helical strake 100 is formed. It is noted, however, that in some embodiments, one or more portions of opening 106 may be omitted as discussed in more detail in reference to FIG. 3. Helical strake 100 may be made of any material including, but not limited to, metal, plastic, fiberglass, synthetic, rubber, wood, or ceramic.

Figure 1B:
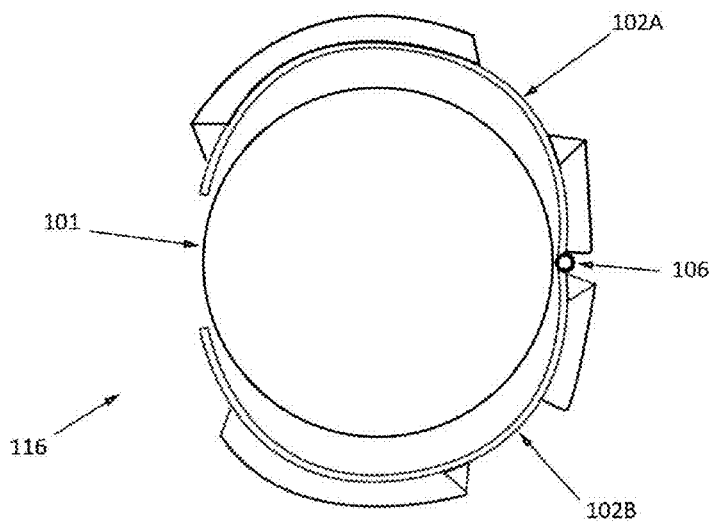
FIG. 1B is an end perspective view of the helical strake of FIG. 1A in an open position.

Referring now to FIG. 1B, helical strake 100 may be positioned around tubular 101 by separating sleeve sides 102A, 102B along opening 116, formed along a side of sleeve 102 opposite opening 106. Once sides 102A, 102B are separated, tubular 101 is inserted through opening 116. Sides 102A, 102B are then closed around tubular 101 to secure helical strake 100 to tubular 101.

A retrofit installation of helical strake 100 about tubular 101, however, can be difficult and costly because special tooling to interface with a remote operated vehicle (ROV) is required to position and secure helical strake 100 around tubular 100. Such tooling can be expensive, difficult and unsafe to use, and requires a slow process for installation of the suppression devices. In addition, it can take months, or even years, to design and fabricate tooling for ROV installation of such helical strake configurations.

Figure 2A:
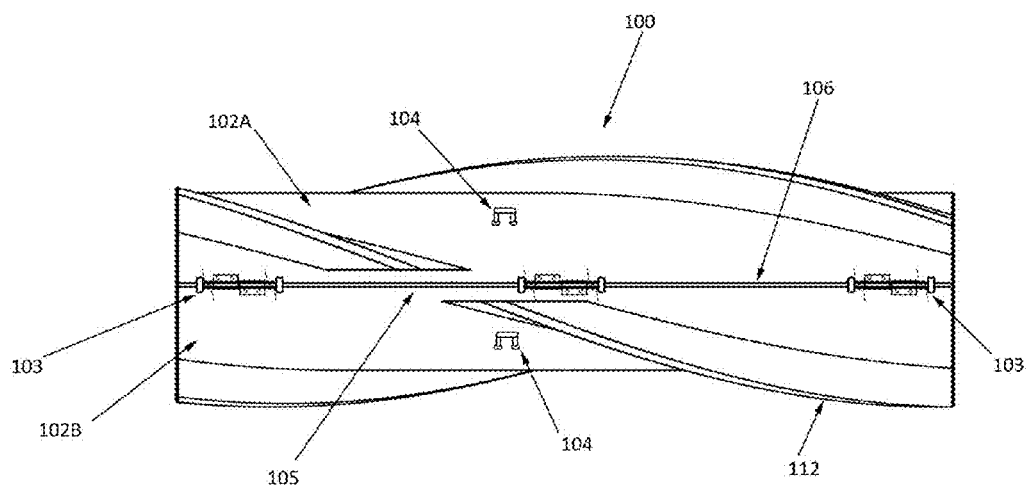
FIG. 2A is a side perspective view of one embodiment of a helical strake having a biasing hinge mechanism.
Figure 2B:
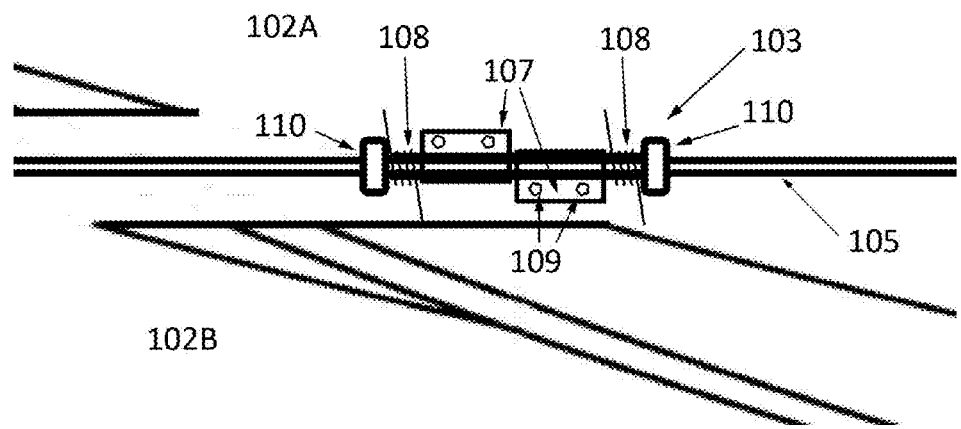
FIG. 2B is a side perspective view of one embodiment of the biasing hinge mechanism illustrated in FIG. 2A.
Figure 3:
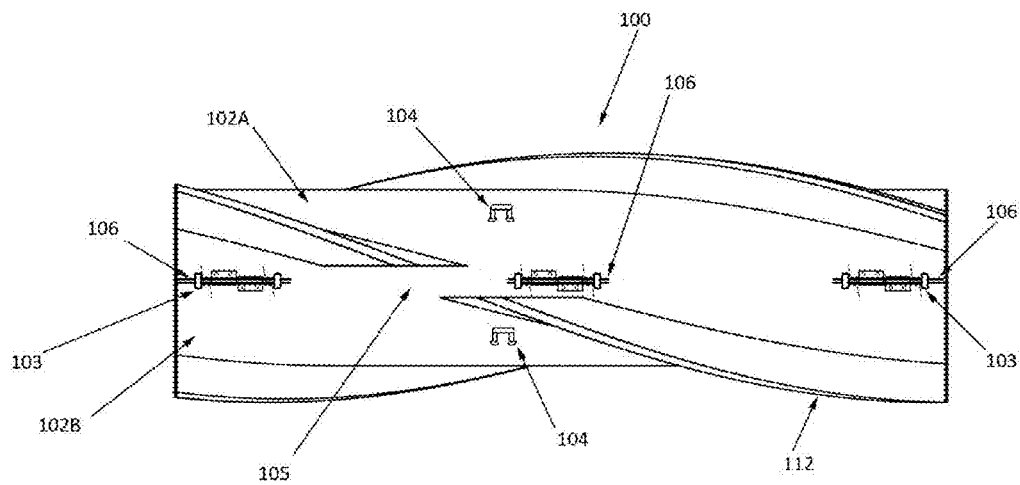
FIG. 3 is a side perspective view of another embodiment of a helical strake.

To eliminate the need for such special tooling, helical strake 100 may include features which can be manipulated directly by the ROV or a diver performing the retrofit installation. Such features may include a biasing hinge mechanism 103 along opening 106 as well as handles 104 as illustrated in FIGS. 2A-2B and FIG. 3. In addition, a securing mechanism 403 that can be easily manipulated by the ROV or diver may be positioned along opening 116 as illustrated in FIG. 4-FIG. 11C.

Returning to FIG. 2A, FIG. 2A illustrates a perspective view of one side of helical strake 100 including one or more of biasing hinge mechanism 103 positioned along opening 106. Biasing hinge mechanism 103 may be configured to bias helical strake sleeve 102 in a closed position. In particular, when the helical strake sleeve 102 is opened as illustrated in FIG. 1B, biasing hinge mechanism 103 biases sleeve side 102A toward 102B, into the closed position. In this aspect, tubular 101 is forced through opening 116 of strake sleeve 102, the installer (e.g., ROV or diver) does not have to exert a substantial force to close sleeve 102 around tubular 101. This in turn, eliminates the need for special tooling which may be required to close sleeve 102 around tubular 101. It is contemplated that any number of biasing hinge mechanisms capable of achieving the desired biasing force may be positioned along opening 106. In the illustrated embodiment, three biasing hinge mechanisms 103 are provided, although one or more than three, for example, four or five, may be used.

Biasing hinge mechanism 103 may be, in one embodiment, a spring hinge as illustrated in FIG. 2B. In this aspect, biasing hinge mechanism 103 may include brackets 107 which are attached to sleeve side 102A and sleeve side 102B along opening 106. In one embodiment, brackets 107 are attached to sleeve sides 102A, 102B using fasteners 109 (e.g., screws, bolts, pins or the like). It is contemplated, however, that brackets 107 may be attached by any suitable mechanism, e.g., welding, chemical boding, or the like. Pin 110 may extend through the interfacing ends of brackets 107 and along opening 106. A biasing member 108 may be positioned at each end of pin 110. In one embodiment, biasing member 108 may be a spring coil which is compressed when strake sleeve 102 is in the closed position and therefore provides a biasing force on helical strake 100 favoring the closed position.

The above discloses one embodiment of a biasing hinge mechanism 103, it is contemplated, however, that biasing mechanisms and geometries may be used. For example, a simple cam pressing against a compression spring may be used as a biasing hinge mechanism or, in another example, a compression or tension spring material may be directly connected to helical strake 100 or through brackets 107. Biasing hinge mechanism 103 may be of any suitable size. Brackets 107 may be attached to helical strake sleeve 102 through fasteners 109 or may be welded, chemically bonded, or attached by any suitable means. Any number or type of biasing mechanism 108 may be attached along pin 110, in this embodiment, two biasing mechanisms are attached at opposing ends of pin 110.

Biasing hinge mechanism 103 may also be made of any suitable material and may be made of more than one material. It is recognized that the optional biasing mechanism in biasing hinge mechanism 103 may be made of a temporary material since they are only used for installation.

The function of the biasing mechanisms, e.g. springs, in biasing hinge mechanism 103 is to keep the strake pressed against the tubular until the latches on the other side may be engaged. But some latching mechanisms will not require springs on the hinges since they may be closed to sufficiently impose pressure on the tubular without the need for a spring to impose pressure. Some devices, such as fairings, may use the same design and do not require pressure on the tubular. Biasing hinge mechanism 103 and handles 104 may be of any suitable design.

Biasing hinge mechanism 103, including one or more of biasing mechanism 108, pin 110, brackets 107, and fasteners 109 may be made of any suitable material including, but not limited to: metals such as Inconel, Elgiloy, Hastelloy, stainless steel, aluminum or copper; rubbers such as polyurethane, nitrile, or neoprene; plastics such as ABS, PVC, polyethylene, or Delrin; fiberglass; or wood. More than one material may be used to make any single component and more than one material may be utilized for the biasing hinge mechanism. It is noted that biasing mechanism 108 may be an optional feature in some embodiments, and may be made of a temporary material since they are only used during installation.

Helical strake 100 may further include handle 104 which can be manipulated directly by the ROV or a diver performing the retrofit installation without the need for special tooling. One or more of handle 104 may be attached to strake sleeve 102 as desired. In the illustrated embodiment, one handle 104 is attached to sleeve side 102A and another handle 104 is attached to sleeve side 102B. Handle 104 may have any structure capable of being used by an ROV or diver to open or close strake sleeve 102 around tubular 101. Representatively, in one embodiment, handle 104 is any structure that protrudes from a surface of strake sleeve 102. For example, handle 104 may be a substantially 'U' shaped protrusion as illustrated in FIG. 2A. Handle 104 may be separately formed and attached to strake sleeve 102, such as by welding, bolting, screwing or a chemical bonding process. In other embodiments, handle 104 is integrally formed with strake sleeve 102 during fabrication of strake sleeve 102. Handle 104 may be made of any suitable material including, but not limited to, metal, plastic, fiberglass, synthetic, rubber, wood, or ceramic.

Helical strake 100 may further include fin opening 105 within fin 112. Fin opening 105 may be formed within a portion of fin 112 along opening 106 to reduce interference when strake 100 is opened.

FIG. 3 illustrates a perspective view of another embodiment of helical strake 100 in which opening 106 is formed along only a portion of helical strake 100. In particular, opening 106 is formed at spaced apart locations along the length helical strake sleeve 102. A biasing hinge mechanism 103, as previously discussed, is positioned at each opening 106. In this case, both the biasing hinge mechanism 103 and the material stiffness of strake sleeve 102 between each hinge 103 provide the biasing force which biases strake sleeve 102 into the closed position. It is further contemplated that in some embodiments, biasing hinge mechanism 103 may be optional, and strake sleeve 102 formed without opening 106. When biasing hinge mechanism 103 and opening 106 are omitted, the material stiffness of strake sleeve 102 provides the biasing force and acts as the biasing mechanism to help close sleeve sides 102A, 102B around tubular 101.

Figure 4:
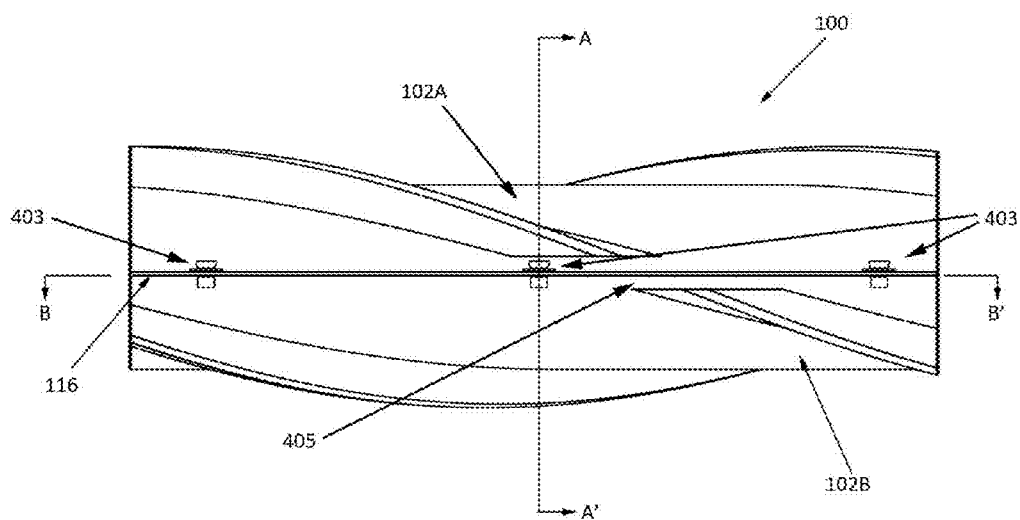
FIG. 4 is a side perspective view of another side of the helical strake of FIG. 1A having a closure mechanism.

FIG. 4 illustrates a perspective view of another side of helical strake 100 illustrated in FIG. 1A. From this view it can be seen that helical strake 100 includes closure mechanisms 403 that close opening 116 along helical strake sleeve 102. An optional opening 405 in one or more of fins 112 may be utilized. When helical strake 100 is closed, closure mechanisms 403 are engaged to impose pressure on tubular 101 to keep helical strake 100 in place.

Any number of closure mechanisms 403 may be used to close helical strake 100. Closure mechanism 403 may have any structure suitable for closing and securing strake side 102A to strake side 102B. Closure mechanisms 403 may be of any suitable material, but will typically be required to maintain their function in seawater for a time period measured in months or years. Representative closure mechanisms are described in reference to FIGS. 5A-11. Closure mechanisms 403 may be of any suitable material, but will typically be required to maintain their function in seawater for a time period measured in months or years.

Figure 5A:
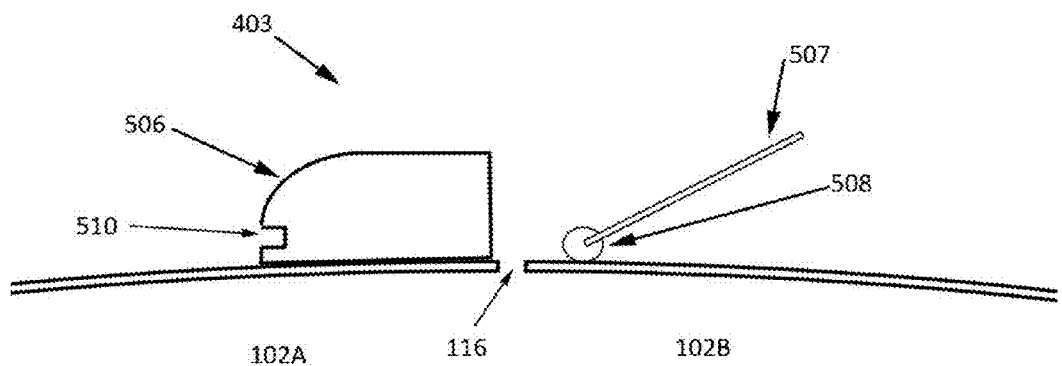
FIG. 5A is a side view of one embodiment of a closure mechanism along line A-A' of FIG. 4.
Figure 5B:
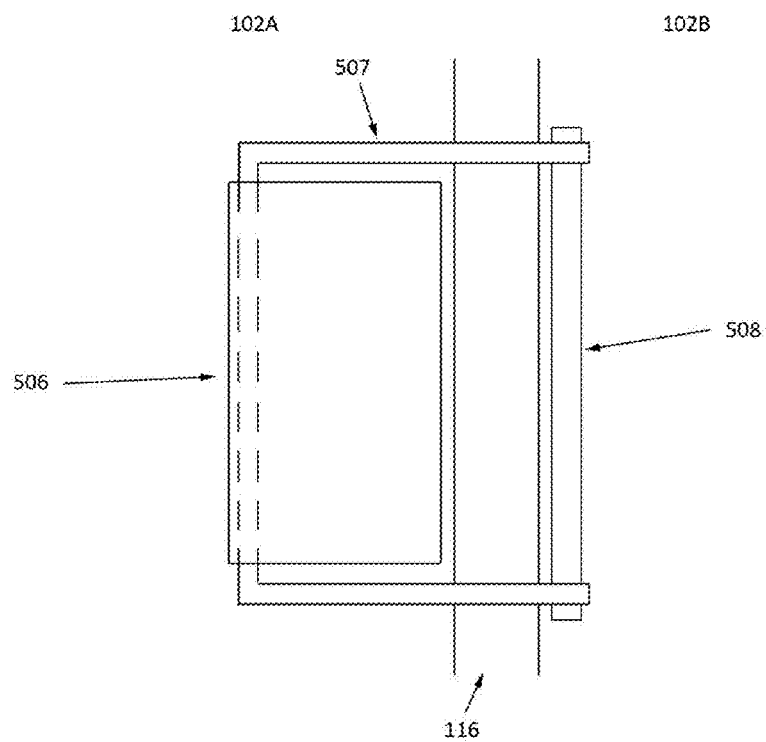
FIG. 5B is a top view of the closure mechanism of FIG. 5A.

Referring to FIG. 5A and FIG. 5B, these figures show a close up view of one embodiment of a closure mechanism 403. In this embodiment, closure mechanism 403 is a latch type mechanism that includes a latch arm 507 attached to pivot mechanism 508, for example a hinge which, in turn, is attached to one of sides 102A or 102B of helical strake sleeve 102. Latch receptacle 506 is attached to the other of sides 102A and 102B.

When latch arm 507 is rotated over latch receptacle 506 as illustrated in FIG. 5B, it engages with the notch 510 in latch receptacle 506 so that it remains latched and therefore helical strake sleeve 102 stays closed around the underlying structure (e.g., tubular 101). Closure mechanism is configured such that notch 510 in latch receptacle 506 is of suitable design (i.e. not too deep) such that helical strake 100 imposes pressure on the tubular underneath it when closure mechanism 403 is closed.

Closure mechanism 403 including latch plate 507, latch receptacle 506, and pivot mechanism 508 may be of any suitable size and shape. Variations of each of the components (geometric variations or otherwise) may be utilized to optimize the design for a given application. It is further noted that pivot mechanism 508 is optional, such that latch plate 507 and latch receptacle 506 may be designed to close sufficiently when latch plate 507 is set at a given angle. Other variations in the latch plate 507 and latch receptacle 506 are possible including any common latch. The invention is not restricted to a given latch design.

Closure mechanism 403 including latch plate 507, latch receptacle 506, and pivot mechanism 508 may be of any suitable material including, but not limited to: metals such as Inconel, Elgiloy, Hastelloy, stainless steel, aluminum or copper; rubbers such as polyurethane, nitrile, or neoprene; plastics such as ABS, PVC, polyethylene, or Delrin; fiberglass; or wood. More than one material may be used to make any single component and more than one material may be utilized for closure mechanism 403.

Figure 6A:
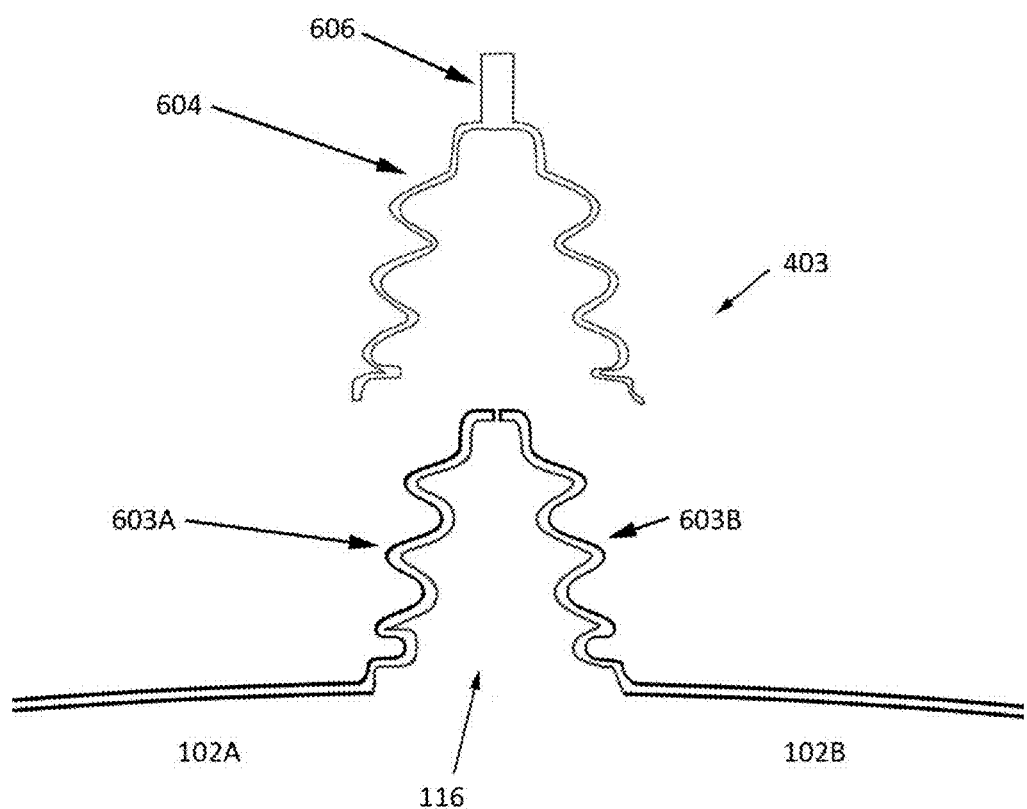
FIG. 6A is an end view of another embodiment of a closure mechanism along line A-A' of FIG. 4.
Figure 6B:
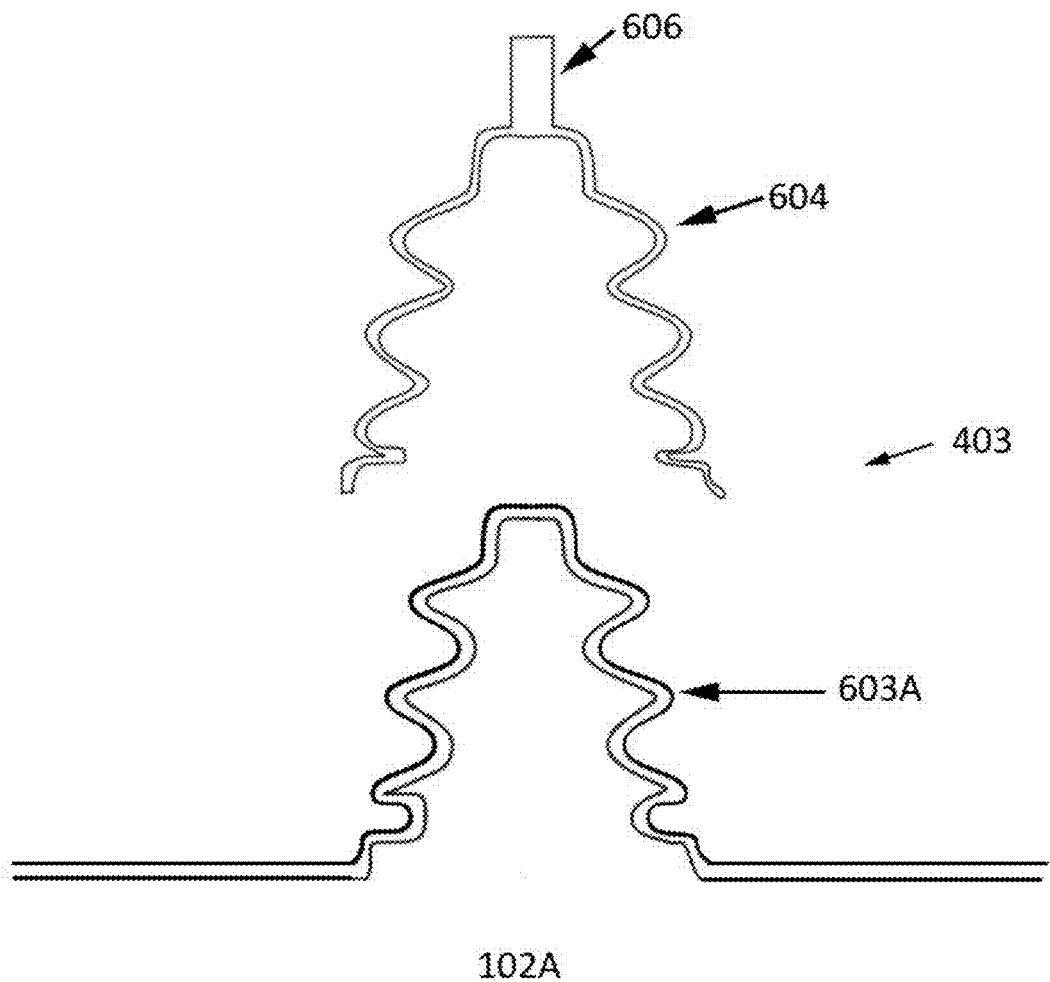
FIG. 6B is a side view of the closure mechanism of FIG. 6A along line B-B' of FIG. 4.

Referring to FIG. 6A and FIG. 6B, these figures show another embodiment of a closure mechanism that may be used to hold opposing sides of a VIV suppression device together. FIG. 6A illustrates the closure mechanism of FIG. 4 along line A-A' and FIG. 6B illustrates the closure mechanism of FIG. 4 along line A-A'. As can be seen from these views, closure mechanism 403 includes a closure side 603A and closure side 603B, which are attached to sleeve sides 102A, 102B, respectively of helical strake 100. Each of closure side 603A and 603B may have any sufficient profile capable of coming together at opening 116 and being held together, by for example, a cap 604. For example, closure sides 603A and 603B may comprise the profile of opposing sides of a bolt, serrated pin, or other profile. When sleeve sides 102A and 102B are closed together, closure sides 603A and 603B are aligned with one another as illustrated in FIG. 6A.

To hold closure side 603A together with closure side 603B, and in turn close opening 116, cap 604 is inserted over each side. In some embodiments, cap 604 may have a handle 606 to facilitate handling of cap 604 by the ROV or diver performing the installation.

Cap 604 is configured such that when it is pushed onto closure sides 603A and 603B, there is some interference which keeps cap 604 in place. In this aspect, cap 604 may have a size and shape complimentary to that of closure sides 603A and 603B, when they are aligned with one another in the closed position.

Closure sides 603A and 603B may be of any suitable size. Cap 604 is designed to just fit over closure sides 603A and 603B and handle 606 may be of any suitable size that facilitates ease of installation by the ROV. Closure sides 603A and 603B may be molded as part of helical strake 100 or may be attached separately.

Closure sides 603A and 603B, cap 604, and handle 606 may be made of any suitable material, including, but not limited to: metals such as Inconel, Elgiloy, Hastelloy, stainless steel, aluminum or copper; rubbers such as polyurethane, nitrile, or neoprene; plastics such as ABS, PVC, polyethylene, or Delrin; fiberglass; or wood. More than one material may be used to make any single component and more than one material may be utilized for the latch system.

It is to be understood that one advantage of this system is that, after installation, cap 604 may be pulled off for removal of the suppression device. This feature allows the suppression device to be retrofitted numerous times at minimal cost.

FIG. 6B illustrates a side view of closure mechanism 403 along line B-B' of FIG. 4. From this view, it can be seen that closure side 603A may be of different cross section when viewed from one direction relative to the normal direction illustrated by FIG. 6A. Although closure sides 603A and 603B are depicted as comprising a conical or pyramidal shape in the figures, it is contemplated that closure sides 603A and 603B may join to form any suitable shape including square, rectangular, trapezoidal, or any suitable geometry. It is further noted that closure sides 603A and 603B do not need to be the same size nor are they required to mate exactly.

Figure 7:
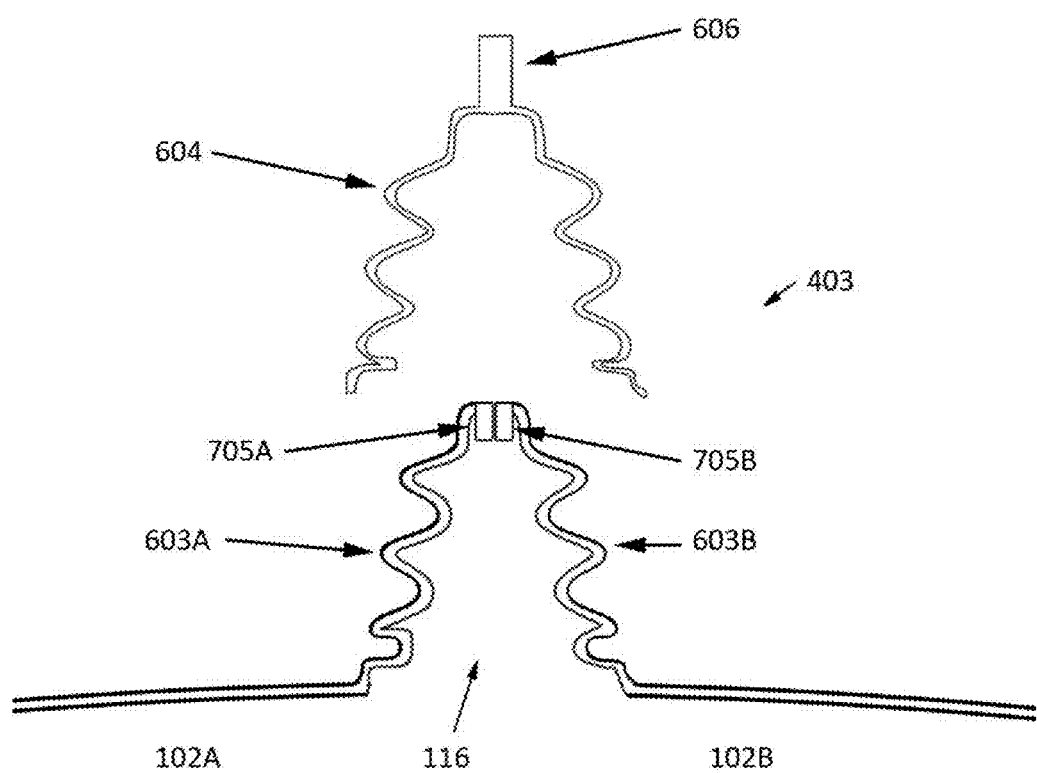
FIG. 7 is an end view of another embodiment of a closure mechanism along line A-A' of FIG. 4.

Referring to FIG. 7, illustrates another embodiment of a closure mechanism along line A-A' of FIG. 4, which is similar to FIG. 6A, except that it includes mating mechanisms 705A and 705B. One of mating mechanisms 705A, 705B are attached to one of closure sides 703A, 703B on each side of opening 116. Mating mechanisms 705A, 705B are configured to assist in holding closure sides 603A, 603B together prior to placement of cap 604. In one embodiment mating mechanisms 705A, 705B are magnets which are attracted to one another. It is contemplated, however, that mating mechanisms 705A, 705B may be any type of mechanism capable of holding closure side 603A against closure side 603B.

In embodiments, where mating mechanisms 705A, 705B are magnets, closure sides 603A and 603B come together, and the magnets contact each other and form a magnetic bond that keeps closure sides 603A and 603B adjacent to each other. In some embodiments, it is contemplated that this magnetic bond may be sufficient to hold sleeve sides 102A, 102B around tubular 101 and impose sufficient pressure (on itself or on an internal tubular) such that cap 604 is not required.

Mating mechanisms 705A, 705B may be of any suitable shape, size, and in the case of magnets, strength. Representatively, the size of the magnets may be selected to provide a suitable magnetic force depending upon the actual application. Mating mechanisms 705A, 705B may be attached to closure sides 603A and 603B by any suitable means including, but not limited to, chemical bonding, magnetic bonding and mechanical fastening. Mating mechanisms 705A, 705B may be made of the same or different material as strake sleeve 102. In the case of a magnetic material, the magnetic material may be any suitable magnetic material including, but not limited to, metals (ferro-magnets), rare earth materials, exotic materials, or any system that comprises an electrical circuit.

Figure 8:
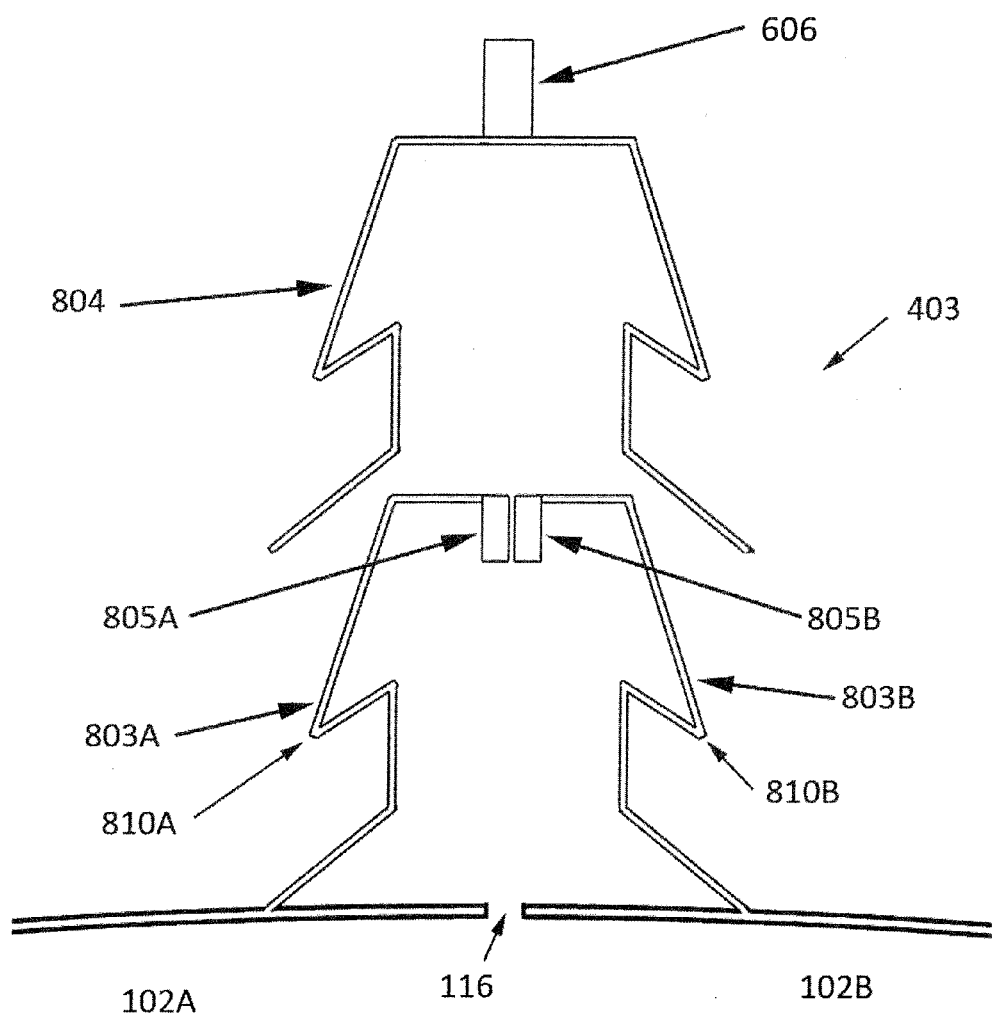
FIG. 8 is an end view of another embodiment of a closure mechanism along line A-A' of FIG. 4.

FIG. 8 illustrates another embodiment of a closure mechanism along line A-A' of FIG. 4. Closure mechanism 403 may include closure side 803A attached to sleeve side 102A and closure side 803B attached to sleeve side 102B. Closure sides 803A and 803B may be substantially similar in operation as closure sides 603A and 603B described in reference to FIG. 7, except that in this embodiment, they have a different profile. Representatively, closure sides 603A and 603B may have barbs 810a and 810b which catch on receiving portions formed within cap 804 to hold sleeve sides 102A and 102B together. Closure mechanism 403 may further include mating mechanisms 805A and 805B similar to mating mechanisms 705A and 705B described in reference to FIG. 7.

Figure 9A:
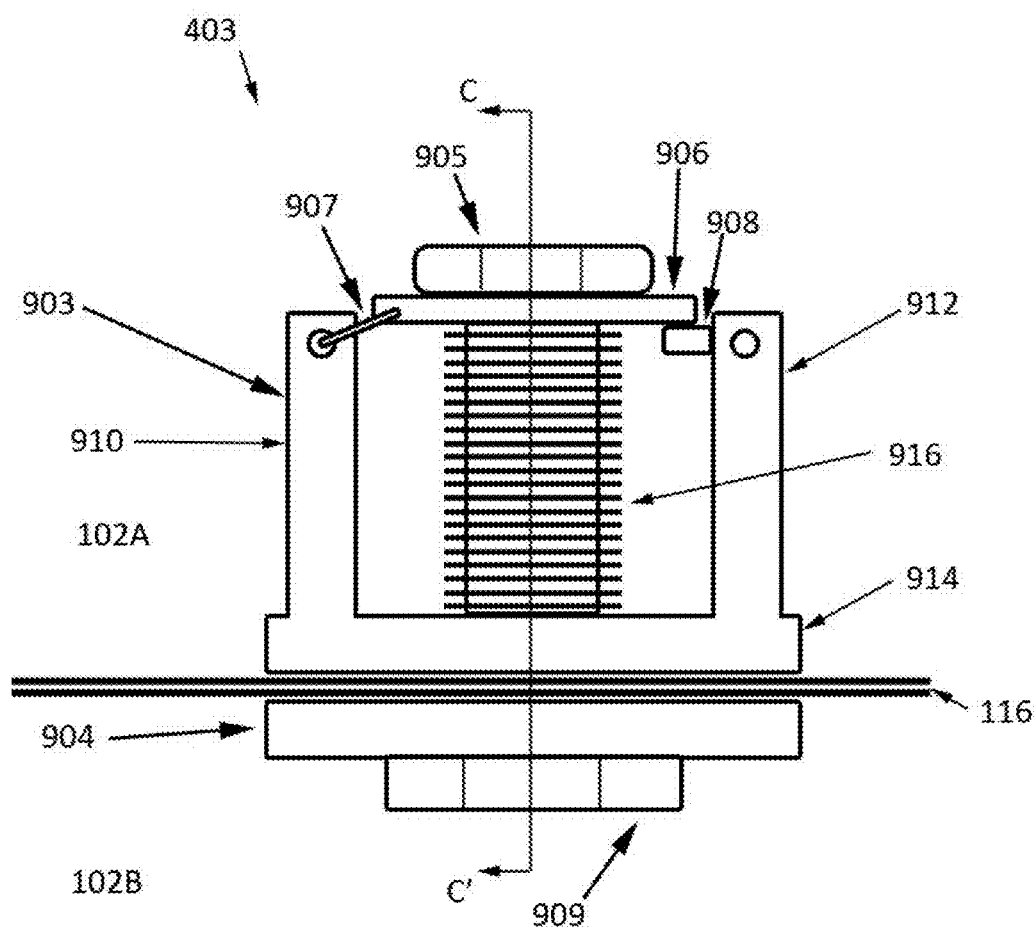
FIG. 9A is a top view of another embodiment of a closure mechanism in an open position.
Figure 9B:
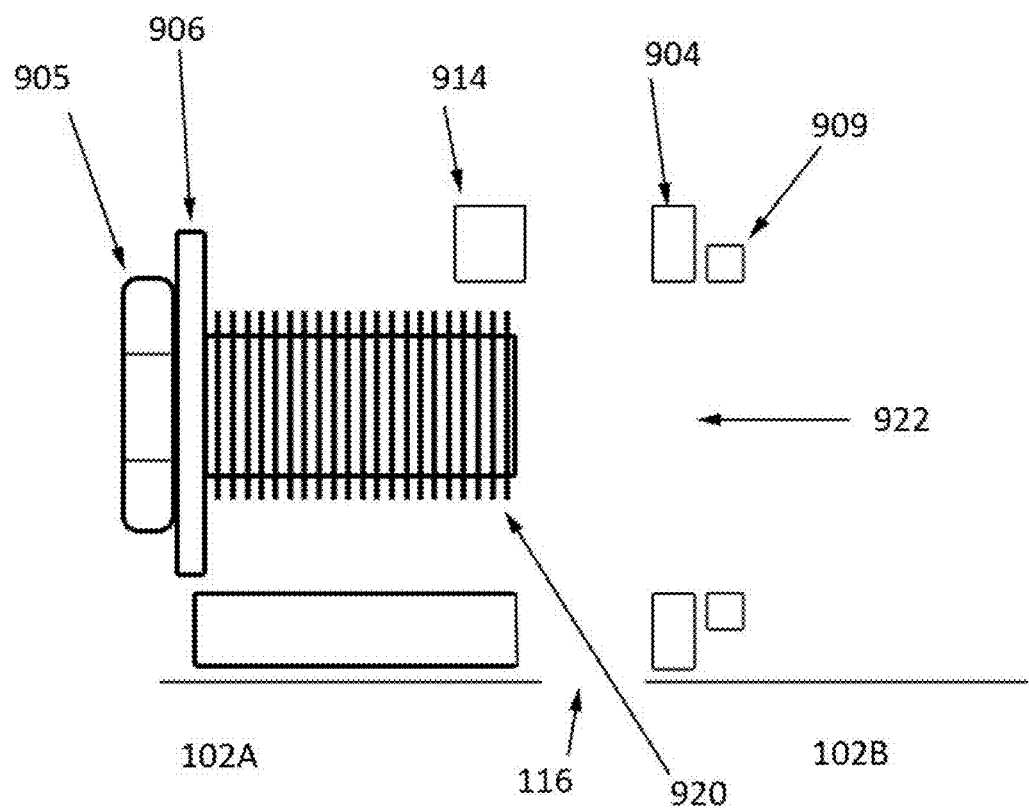
FIG. 9B is a side view of the closure mechanism of FIG. 9A along line C-C'.
Figure 9C:
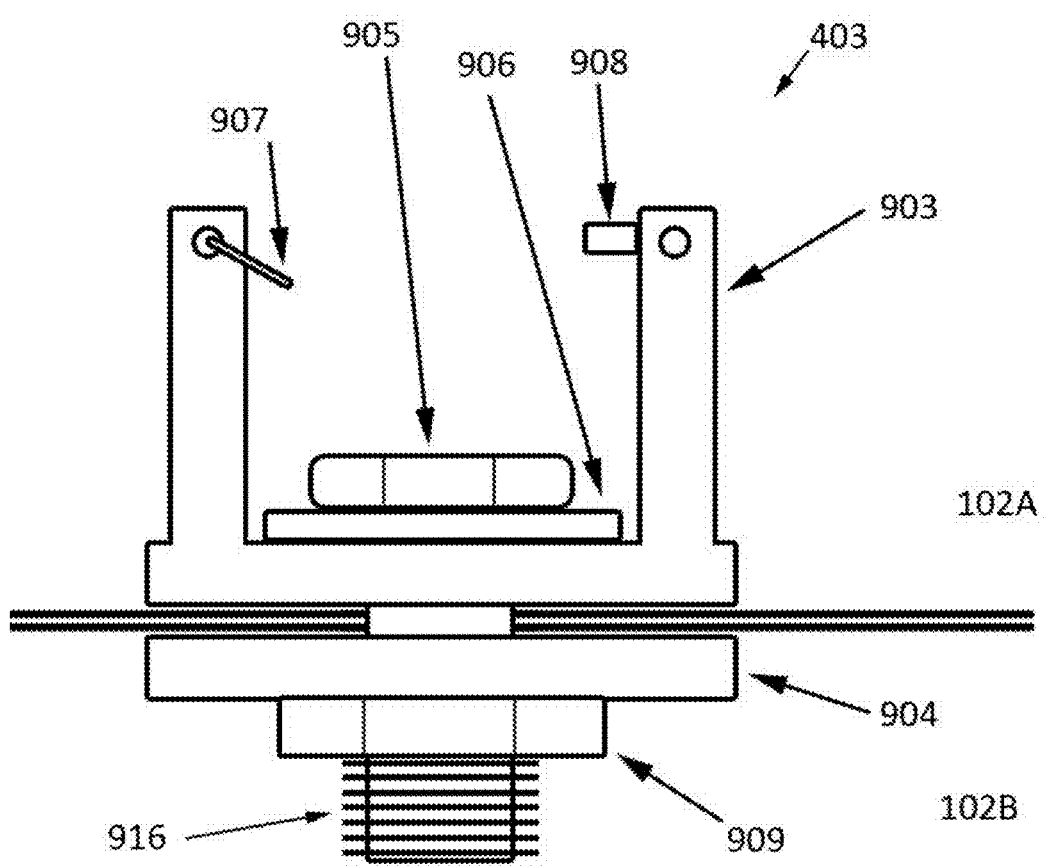
FIG. 9C is a top view of the closure mechanism of FIG. 9A in a closed position.

FIG. 9A, FIG. 9B and FIG. 9C illustrate another embodiment of a closure mechanism. FIG. 9A illustrates the closure mechanism along line A-A' of FIG. 4 when in an open position. FIG. 9B illustrates the closure mechanism along line C-C' of FIG. 9A. FIG. 9C illustrates the closure mechanism of FIG. 9A in a closed position. Closure mechanism 403 may include a male housing 903 attached to sleeve side 102A and female housing 904 attached to sleeve side 102B. Each of male housing 903 and female housing 904 may be attached to their respective sides 102A, 102B along opening 116.

Male housing 903 may be a channel like structure dimensioned to maintain alignment of pin 905 with an opening 922 formed through female housing 904 when sides 102A and 102B are brought together as illustrated. Representatively, male housing 903 may include side walls 910, 912 which rest on a surface of sleeve side 102A along opposing sides of pin 905. Base member 914 may be positioned across a bottom end of side walls 910, 912 and include an opening 920 through which pin 905 may be inserted. Male housing 903 may also include optional washer 906 which helps to support pin 905 at one end using clip 907 and/or stop 908. Each of side walls 910, 912, base member 914, washer 906, clip 907 and stop 908 may be formed as separate pieces and then assembled together, or as one integrally formed piece that is, for example, molded from plastic.

Female housing 904, which is attached to sleeve side 102B, holds receptacle 909 in place. In this aspect, female housing 904 may be a bracket type structure that extends from the surface of sleeve side 102B and faces opening 116. Receptacle 909 may be a washer type structure in that it includes an opening for receiving pin 905. Receptacle 909 may be attached to a side of female housing 904 opposite opening 116, or it may be attached to the side facing opening 116. Female housing 904 and male housing 903 may be attached to their respective sleeve side using any suitable attachment mechanism, e.g., bolting, screwing, welding, molding, chemical bonding or the like.

During operation, pin 905 begins in a retracted position as illustrated by FIG. 9A and is held into place by either clip 907 or stop 908. When the ROV presses on pin 905, it is inserted through receptacle 909 as shown in FIG. 9C. By pressing pin 905 through receptacle 909, sides 102A and 102B are now latched together.

Male housing 903, female housing 904, receptacle 909, pin 905, washer 906, clip 907, and stop 908 may be made in any suitable size. Typically pin 905 will range from 2 to 8 inches long and the accompanying hardware will be fit to match the pin size. Pin 905 may be of any suitable design but is designed to go through receptacle 909 with an interference fit on its threads 916 or appurtenances. Clip 907 may be of any suitable design and merely designates an attachment between male housing 903 and pin 905 that may be broken when the pin is inserted into receptacle 909. Stop 908 may be of any suitable design and merely indicates an appurtenance that acts as an obstacle for pin 905 that can be passed when the pin 905 is inserted into receptacle 909. One or more clips 907 and stops 909 are used to hold pin 905 in place before it is inserted, and any number or combination of clips or stops may be used.

Still referring to FIG. 9A, male housing 903, female housing 904, receptacle 909, pin 905, washer 906, clip 907, and stop 908 may be made of any suitable material including, but not limited to metal, plastic, rubber, fiberglass, synthetic, wood, or exotic materials. One pin 905 is inserted through receptacle 909, parts of this latch system (for example, clip 907 or stop 908, or parts of male housing 903) are no longer needed, and they may be made of a material that will corrode or dissolve in seawater. It is further noted that in one embodiment, pin 905 may be a screw or bolt driven in by the ROV or diver. The head of pin 905 may be of any suitable size and may have a lanyard or other cabling attached to it to make it easier for the ROV or diver to grab and turn.

It is to be understood that one advantage of this system is that, after installation, pin 905 may be cut for removal of the suppression device. At the surface, pin 905 may then be replaced for reinstallation of the suppression device. This feature allows the suppression device to be retrofitted numerous times at minimal cost.

Figure 10A:
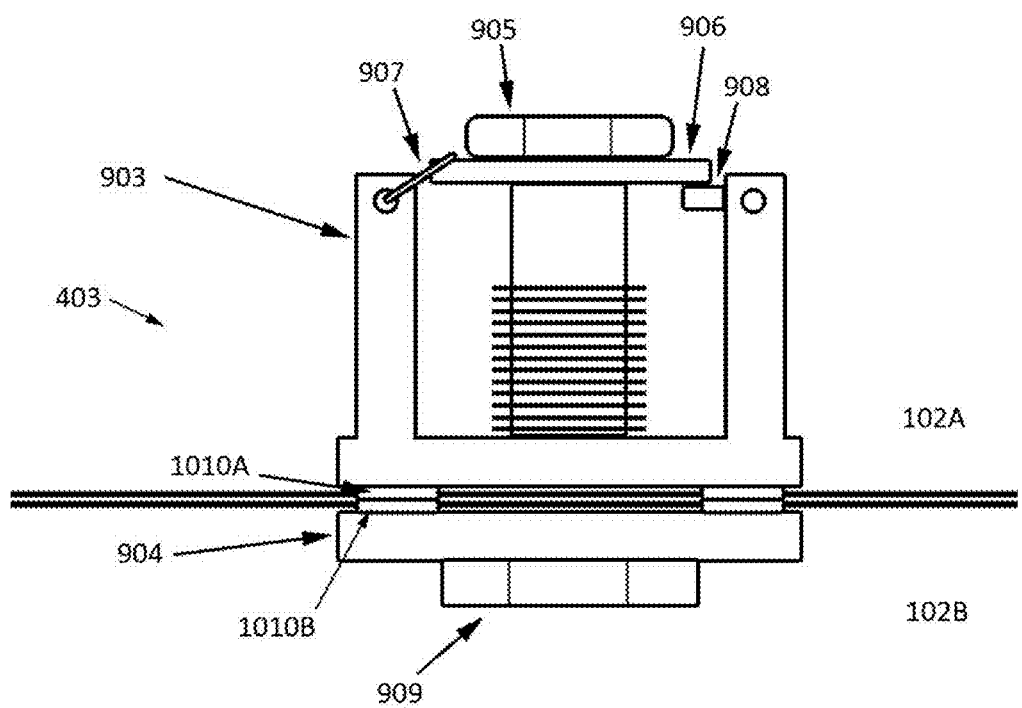
FIG. 10A is a top view of another embodiment of a closure mechanism in an open position.
Figure 10B:
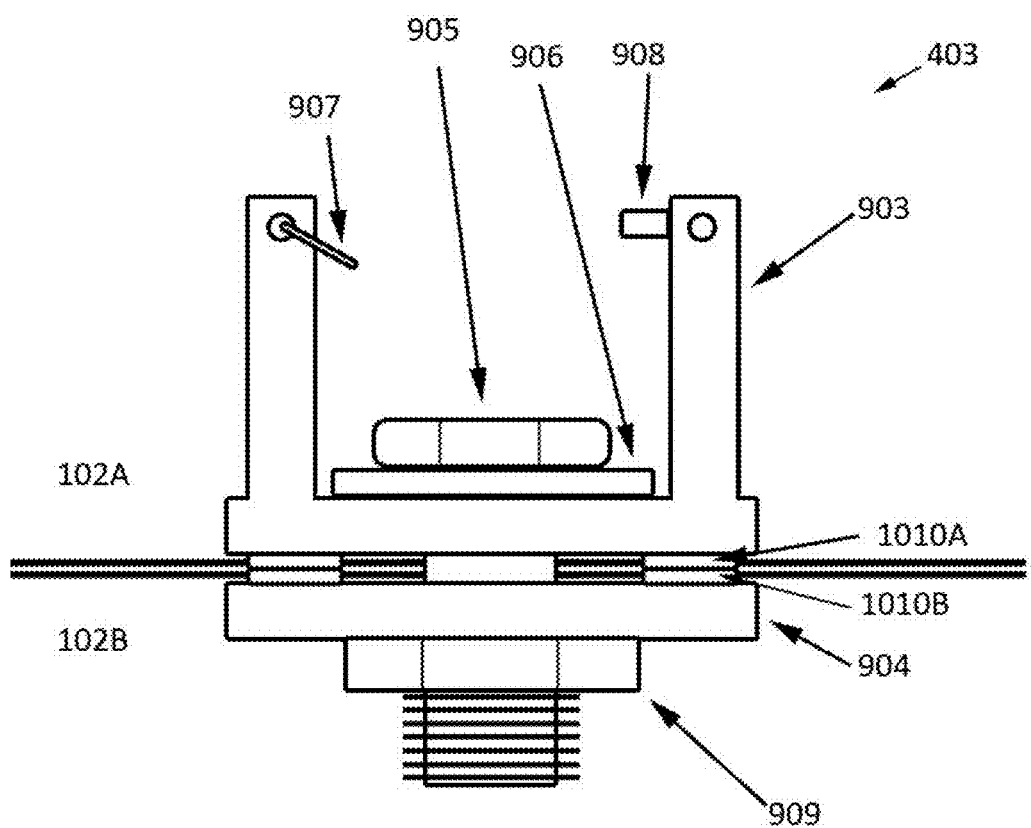
FIG. 10B is a top view of the closure mechanism of FIG. 10A in a closed position.

FIG. 10A and FIG. 10B illustrate another embodiment of a closure mechanism along line A-A' of FIG. 4. Closure mechanism 403 is substantially the same as the closure mechanism described in reference to FIGS. 9A-9C, except in this embodiment, mating mechanisms 1010A and 1010B are attached to male housing 903 and female housing 904. Mating mechanisms 1010A and 1010B may be substantially the same as mating mechanisms 705A, 705B, 805A and 805B described in reference to FIG. 7 and FIG. 8. Representatively, mating mechanisms 1010A and 1010B may be magnetic members attached to interfacing portions of male housing 903 and female housing 904.

In the case of a magnetic material, mating mechanisms 1010A and 1010B allow for sleeve sides 102A and 102B to be temporarily magnetically bonded before pin 905 is inserted into receptacle 909. Thus, the installation sequence includes bringing the device around the tubular and temporarily attaching sides 102A and 102B, and then using the insertion of pin 905 for a more permanent attachment. Pin 905 can also be a bolt, and/or may also have a spring under it to provide tension. It is further noted that in one embodiment, pin 905 may be a screw or bolt driven in by the ROV or diver. The head of pin 905 may be of any suitable size and may have a lanyard or other cabling attached to it to make it easier for the ROV or diver to grab and turn.

Referring now to FIG. 10A, this figure shows sleeve side 102A coming together with side 102B. Male housing 903, which is on side 102A, holds pin 905 and optional washer 906 using clip 907 and/or stop 908 to hold pin 905 in place. Female housing 904, which is on side 102B, holds receptacle 909 in place. Once sides 102A and 102B are aligned with one another, the ROV or diver presses pin through male housing 903 and into female housing 904 as illustrated in FIG. 10B, which in turn holds sides 102A and 102B together.

Figure 11A:
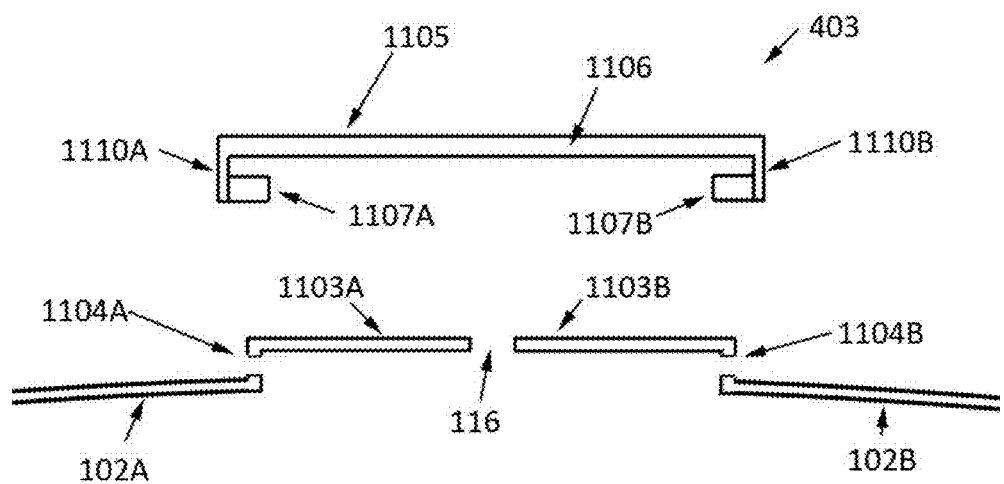
FIG. 11A is an end view of another embodiment of a closure mechanism along line A-A' of FIG. 4 in an open position.
Figure 11B:
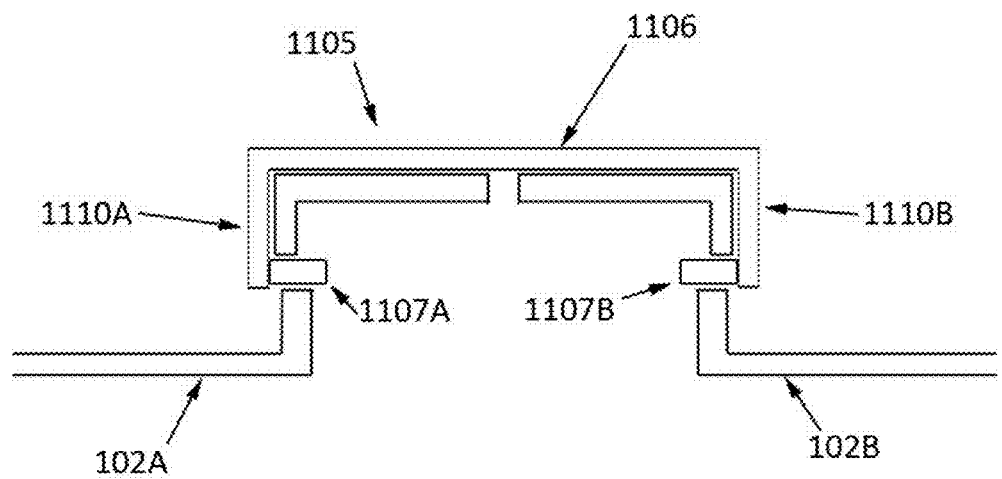
FIG. 11B is an end view of the closure mechanism of FIG. 11A in a closed position.

FIG. 11A and FIG. 11B illustrate another embodiment of a closure mechanism along line A-A' of FIG. 4. In this embodiment, VIV suppression device sides, for example, helical strake sleeve sides 102A and 102B, include extension members 1103A and 1103B which extend from interfacing ends of sleeve sides 102A and 102B. Extension members 1103A and 1103B may have a substantially 'L' shaped profile with the short arm perpendicular to the surface of sides 102A and 102B and the long arm parallel to the surface. Holes 1104A and 1104B may be formed through the short arm portions of each of extension members 1103A and 1103B. Holes 1104A and 1104B are dimensioned to receive clip portions 1107A, 1107B which extend inward from side walls 1110A and 1110B of cap 1105. Side walls 1110A and 1110B extend from a base member 1106 of cap 1105.

When cap 1105 is lowered onto extension members 1103A and 1103B as illustrated in FIG. 11B, clips 1107A and 1107B engage holes 1104A and 1104B to latch device sides 102A, 102B together. Base member 1106 of cap 1105 may also contain a spring (not shown) that helps keep clips 1107A and 1107B in place. Clips 1107A and 1107B, along with corresponding holes 1104A and 1104B, may be of any suitable geometry. Extension members 1103A and 1103B may be devices sides 102A, 102B (i.e. integrally formed with), or may be attached separately. Cap 1105 may also have a handle for ease of installation (not shown).

If cap 1105 includes a spring, then additional closing pressure is brought onto sleeve sides 102A and 102B of the VIV suppression device (e.g., helical strake) and may impart additional pressure onto the tubular to which it is attached. In addition, the spring can serve to mitigate changes in the tubular diameter due to hydrostatic pressure, or other causes.

Cap 1105, extension members 1103A and 1103B, clips 1107A and 1107B, and base member 1106 may be made of any suitable material such as any of the previously discussed materials.

Figure 12A:
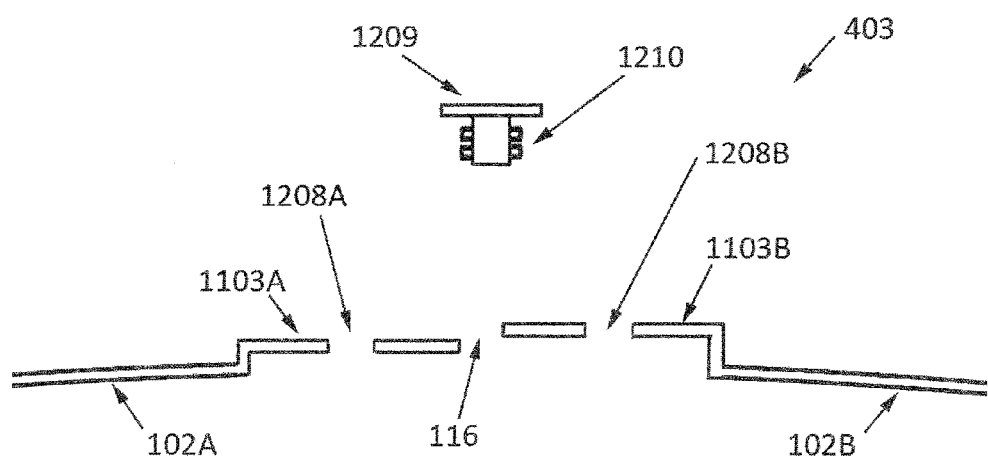
FIG. 12A is an end view of another embodiment of a closure mechanism along line A-A' of FIG. 4 in an open position.
Figure 12B:
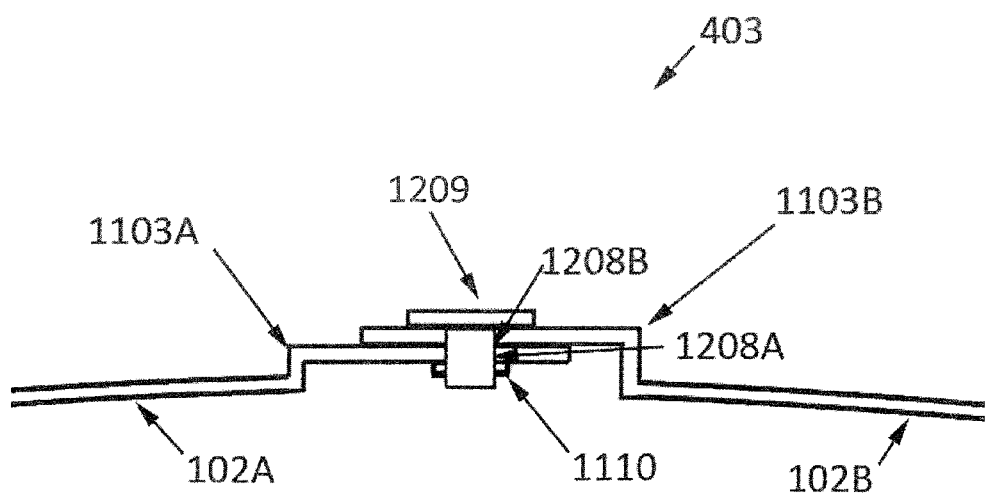
FIG. 12B is an end view of the closure mechanism of FIG. 12A in a closed position.

FIG. 12A and FIG. 12B illustrate another embodiment of a of a closure mechanism along line A-A' of FIG. 4. Closure mechanism 403 is substantially the same as that described in reference to FIGS. 11A-11B, except that instead of having a cap to hold device sides 102A and 102B together, extension members 1103A and 1103B overlap one another and are secured together using pin 1209. In this aspect, holes 1208A and 1208B are formed along the top portions of extension members 1103A and 1103B. Holes 1208A and 1208B are dimensioned to overlap one another and receive pin 1209. Pin 1209 may include appurtenances 1210 which, in one embodiment, provide an interference fit between pin 1209 and holes 1208A and 1208B.

When device sides 102A, 102B are pushed together such that extension members 1103A and 1103B overlap as illustrated in FIG. 12B, pin 1209 can be inserted into the holes to lock then together, and in turn, secure the VIV suppression device around the underlying structure.

Pin 1209 may consist of any reasonable structure that allows its insertion into the holes 1208A, 1208B, thus pin 1209 and holes 1208A and 1208B may be of any reasonable geometry. Pin 1209 may be tapered to ease installation or to help insure that it stays in place. Pin 1209 may be further locked into place by other mechanical means. Appurtenances 1210 may consist of any suitable geometry and may act as springs or may simply provide interference with holes 1208A and 1208B.

It is further contemplated that pin 1209, extension members 1103A and 1103B, and appurtenances 1210 may be of any suitable size, shape, or material, with their exact size, shape, and material determined by the requirements of their application.

Figure 13:
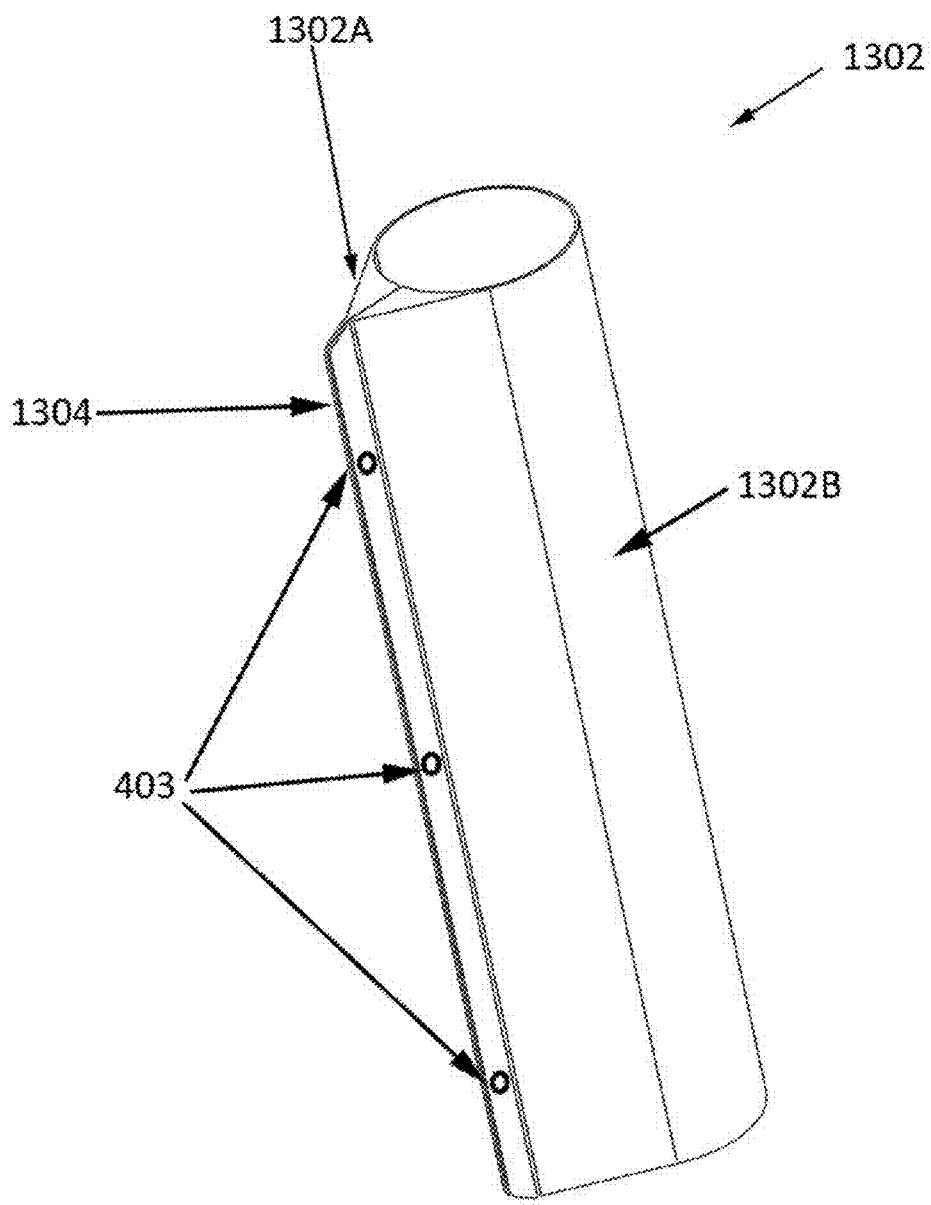
FIG. 13 is a perspective view of a fairing.

It is to be understood that although the previously described biasing hinge mechanisms and closure mechanisms are described in reference to helical strake 100, they may be used with any type of VIV suppression device configured to encircle and be attached around, an underlying structure such as a tubular. Representatively, any one or more of the previously discussed biasing hinge mechanisms and closure mechanisms may be used to attach a fairing such as that illustrated in FIG. 13 to an underlying structure. In particular, as illustrated in FIG. 13, fairing 1302 includes an opening 1304 along one side similar to the opening 116 described in reference to the previous figures. Any of the previously discussed closure mechanisms 403 may be used to hold fairing side 1302A together with fairing side 1302B. Although not shown, it should also be understood that where fairing includes a second opening along the opposite side, such opening could be configured to have any one or more of the previously discussed biasing hinge mechanisms to bias fairing sides 1302A and 1302B into the closed position around an underlying tubular.

In general, the concepts described herein may be applied to any VIV suppression device, or any of its associated components, that have one or more openings along the length axis. Such VIV suppression devices may include, helical strakes, fairings, a VIV suppression device that encircles the underlying tubular and has other shapes and sizes (e.g., round, square, rectangular, etc.) and collars.

Figure 14:
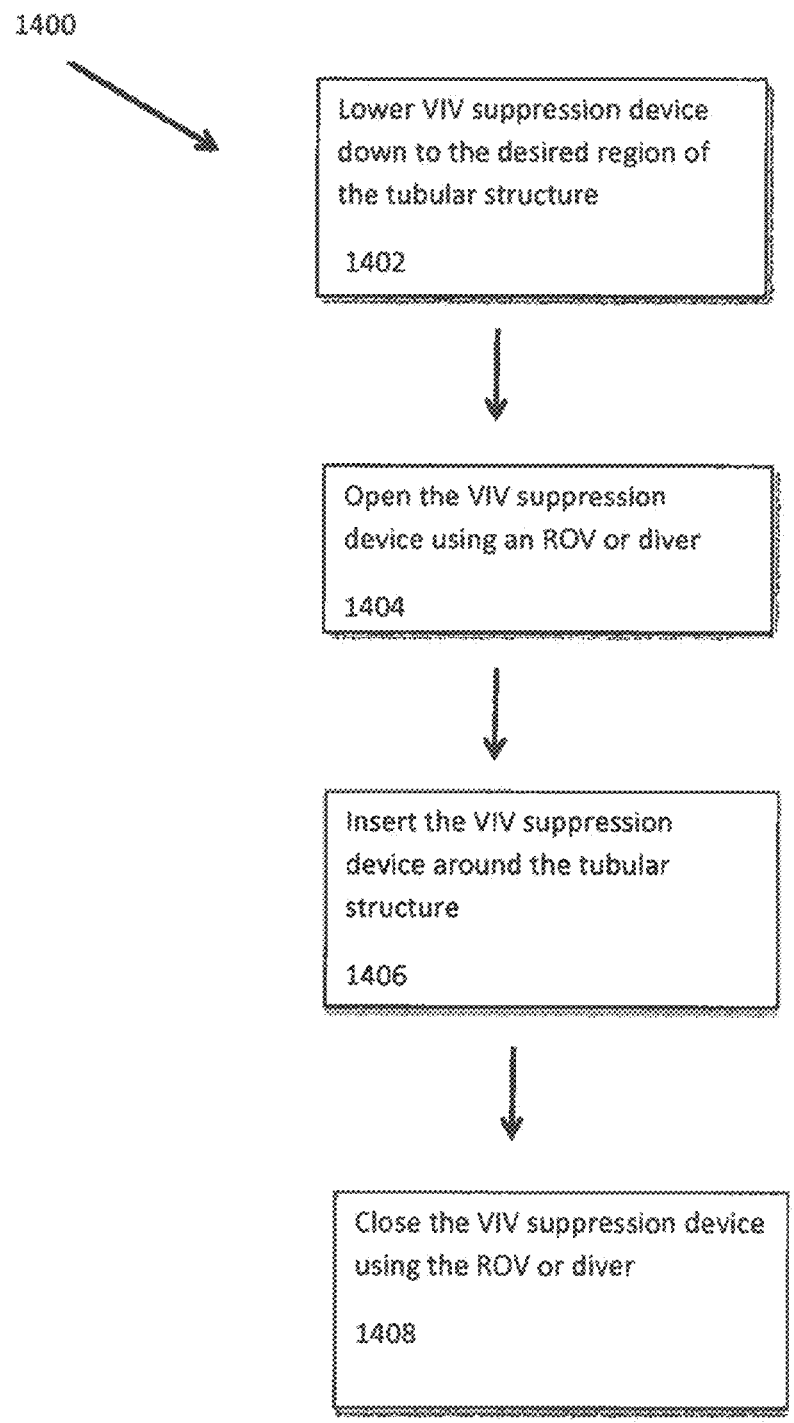
FIG. 14 is a flow chart illustrating one embodiment of a retrofitting process.

The VIV suppression devices disclosed herein may be attached to the underlying tubular structure by retrofitting using an ROV or diver, or prior to installation of the tubular structure. A retrofit installation process is illustrated in the flowchart of FIG. 14. In particular, flow chart 1400 illustrates a retrofit installation processing which includes lowering of the VIV suppression device (e.g., helical strake 100) down to the desired region of the tubular, which is underwater using, for example, a diver, ROV, winch line or other suitable mechanism (block 1402). Once at the desired position, the diver or ROV may be used to open the VIV device (block 1404) and insert the device around the tubular structure (block 1406) according to the previously discussed techniques. For example, grasping handles 104 to pull the device sides apart. Once the device is around the tubular structure, the diver or ROV can close the device around the tubular (block 1408). The biasing hinge mechanism previously discussed, which is attached between the sides, biases the sides toward one another to facilitate closing of the device around the tubular. The diver or ROV may further secure the sides of the device to one another by manipulating any of the above described closure mechanisms. In one embodiment, after positioning the device around the tubular, the diver or ROV may rotate the device around the tubular such that the opening and closure mechanisms are facing the diver or ROV. In this manner, the diver or ROV may more easily manipulate the closure mechanism. It is noted that each of the retrofit installation steps described herein may be performed by the ROV or diver without any special tooling. Rather, the biasing hinge mechanism and closure mechanisms may be directly manipulated by components already present on exiting ROV devices or by hand by the diver. In this aspect, retrofit installation using any of the above described VIV devices is simpler and more cost effective than existing methodologies which require special tooling.

Alternatively, prior to running the tubular structure down to the sea floor, the VIV devices may be placed in an open configuration, positioned adjacent the tubular structure and then closed around the tubular structure. The tubular structure may then be lowered down through the water to the sea floor.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

In the foregoing specification, the invention has been described with reference to specific embodiments thereof. It will, however, be evident that various modifications and changes can be made thereto without departing from the broader spirit and scope of the invention as set forth in the appended claims. For example, although each of the previously discussed biasing hinge mechanisms and closure mechanisms are used in connection with a VIV suppression device installed on an underlying tubular through a retrofit installation procedure, it is contemplated that they may be used to facilitate installation of the VIV suppression device above water. In addition, the underlying structure need not be a tubular structure, it could be any type of structure experiencing vibrational forces, for example, a structure experiencing wind turbulence such as a smoke stack or other structure subject to wind forces. The specification and drawings are, accordingly, to be regarded in an illustrative rather than a restrictive sense.

What is claimed is:

1. A method of retrofitting a vortex-induced vibration (VIV) suppression device to a tubular structure, the method comprising:
    opening a VIV suppression device underwater using one of an ROV or a diver, the VIV suppression device having a handle to facilitate opening of the VIV suppression device by the ROV or diver;
    positioning the VIV suppression device around the tubular structure; and
    closing the VIV suppression device around the tubular structure using a spring hinge coupled to the VIV suppression device that biases the VIV suppression device in the closed position, wherein the spring hinge comprises a pin which provides a pivot point for rotation of a first side and a second side of the VIV suppression device between an open position and the closed position and a spring having a first end positioned along the first side and a second end positioned along the second side, and wherein the first end and the second end apply a biasing force to the first side and the second side and the biasing force is in a direction tangential to a radius of the pin such that the first side and the second side are biased toward the closed position.

2. The method of claim 1 further comprising:
    securing the VIV suppression device around the tubular structure.

3. The method of claim 2 wherein securing comprises, using the ROV or diver, positioning a latch arm within a receiving receptacle attached to the VIV suppression device.

4. The method of claim 2 wherein securing comprises, using the ROV or diver, positioning a cap over a first closure member and a second closure member extending from opposing sides of the VIV suppression device.

5. The method of claim 2 wherein securing comprises, using the ROV or diver, inserting a pin through a male housing and a female housing attached to opposing sides of the VIV suppression device.

6. The method of claim 1 wherein the VIV suppression device is a helical strake.

7. The method of claim 1 wherein the VIV suppression device is a fairing.

8. A vortex-induced vibration (VIV) suppression device comprising:
a body portion dimensioned to surround a structure subject to VIV, the body portion having a first side and a second side separated by a first opening formed along a length dimension of one side of the body portion and a second opening formed along the length dimension of another side of the body portion;
a biasing hinge mechanism attached to the first side and the second side at the first opening, the biasing hinge mechanism comprising a first bracket attached to the first side, a second bracket attached to the second side, a pin extending through the first bracket and the second bracket and along the first opening such that the first side and the second side pivot around the pin and a spring positioned around each end of the pin, the spring having a first end positioned along the first side and a second end positioned along the second side, and wherein the first end and the second end provide a biasing force on the first side and the second side, respectively, and wherein the biasing force is in a direction tangential to a radius of the pin such that the first side and the second side are biased toward one another; and
a closure mechanism attached to the first side and the second side at the second opening, the closure mechanism to secure the first side and the second side in a closed position around the structure.

9. The suppression device of claim 8 wherein the body portion is a helical strake sleeve, and the device further comprises a plurality of helically oriented fins positioned around the helical strake sleeve.

10. The suppression device of claim 9 wherein the first bracket is attached to the first side near the first opening, the second bracket is attached to the second side near the first opening and the spring is attached to each of the first bracket and the second bracket to bias the first bracket and the second bracket away from one another.

11. The suppression device of claim 8 wherein the closure mechanism comprises a rotatable latch plate attached to the first side near the second opening and a latch receptacle attached to the second side near the second opening, wherein the latch plate is rotatable about a pin and comprises an opening and the latch receptacle comprises a notch such that the latch plate is capable of rotation over the latch receptacle and the notch is capable of receiving the latch plate and holding the latch plate therein to secure the first side to the second side.

12. The suppression device of claim 8 wherein the closure mechanism comprises a first closure portion extending from the first side near the second opening, a second closure portion extending from the second side near the second opening and a cap portion dimensioned to be positioned over the first closure portion and the second closure portion when the first closure portion and the second closure portion are aligned with one another.

13. The suppression device of claim 12 wherein the cap portion further comprises a handle member extending from a top of the cap portion.

14. The suppression device of claim 12 further comprising:
a first mating portion attached to the first closure portion; and
a second mating portion attached to the second closure portion, wherein the first mating portion and the second mating portion are capable of holding the first closure portion and the second closure portion together in the absence of the cap portion.

15. The suppression device of claim 8 wherein the closure mechanism comprises a male portion attached to the first side, a female portion attached to the second side and a pin member dimensioned to be inserted between and hold together the male portion and the female portion.

16. The suppression device of claim 15 further comprising:
a first mating portion attached to the male portion; and
a second mating portion attached to the female portion, wherein the first mating portion and the second mating portion are capable of holding the male portion and the female portion together.

17. The suppression device of claim 8 wherein the closure mechanism comprises a first extension member extending from the first side, a second extension member extending from the second side and one of a cap or a pin to attach the first extension member to the second extension member.

18. The suppression device of claim 8 further comprising:
a first handle attached to the first side; and
a second handle attached to the second side, wherein the first handle and the second handle are dimensioned to be manipulated by an ROV or a diver directly to pull the first side away from the second side during an installation operation.

19. The suppression device of claim 8 wherein the first opening extends less than an entire length of the VIV body portion such that a material stiffness of portions of the body portion next to the biasing hinge mechanism help to bias the first side and the second side toward one another.

* * * * *